Jan. 12, 1960 J. H. EDMAN 2,920,500
ADJUSTABLE LOCKING LIFT LINK
Filed July 21, 1955 2 Sheets-Sheet 1
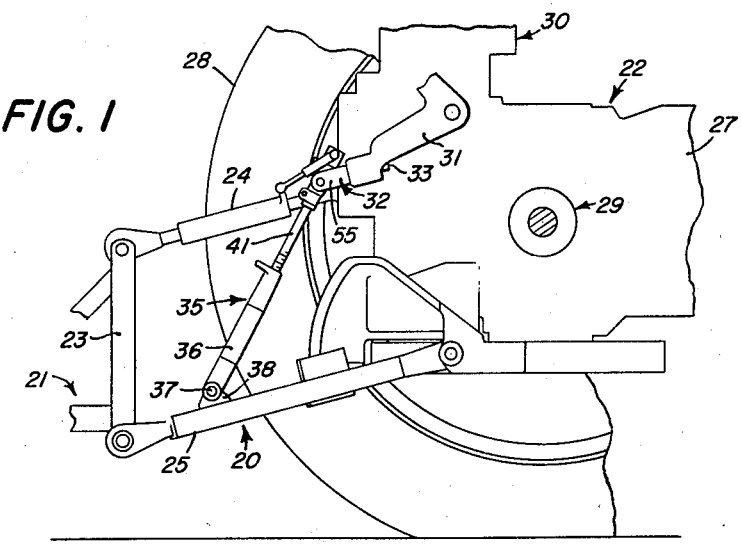
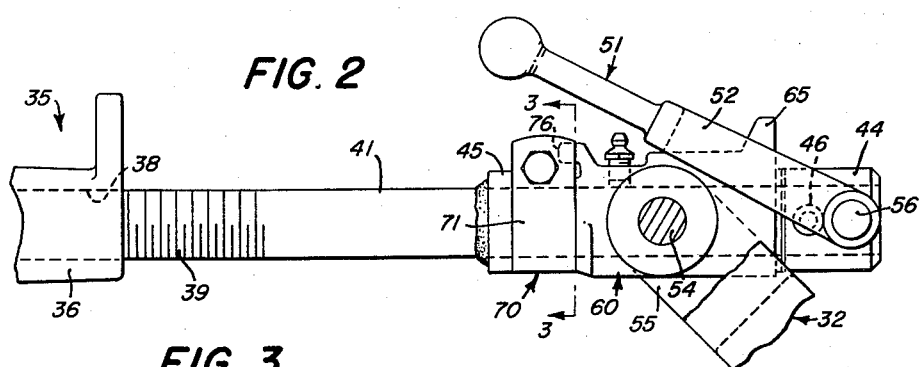
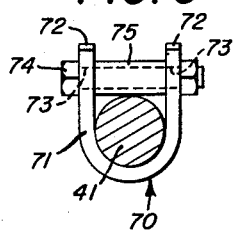
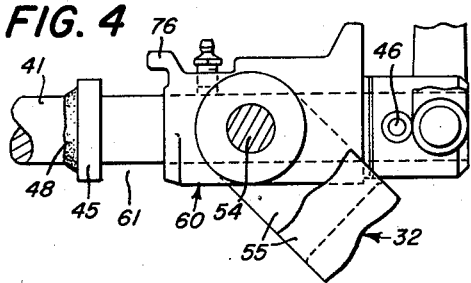
INVENTOR.
JOHN H. EDMAN
ATTORNEYS

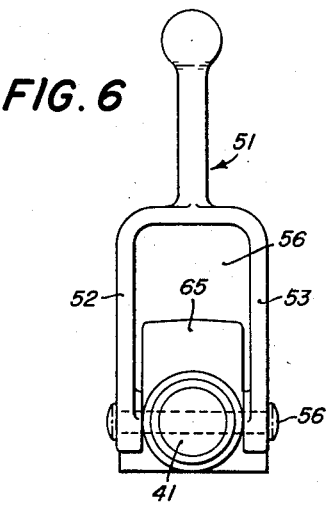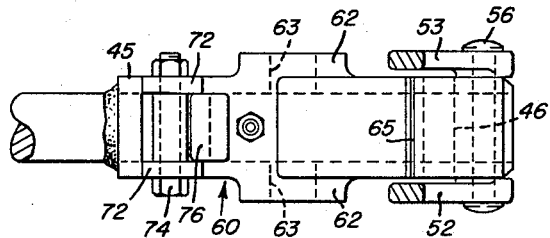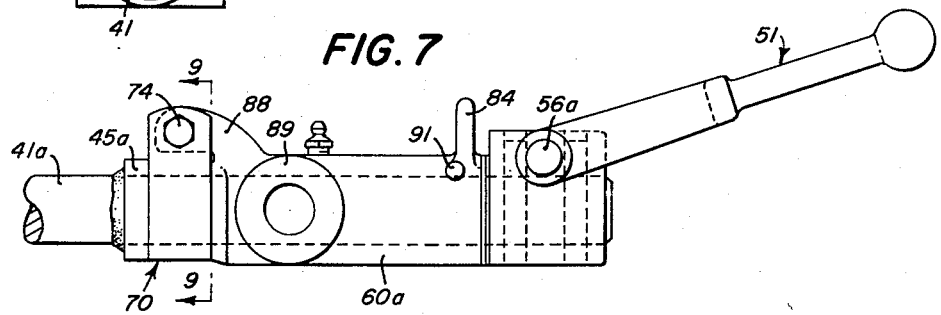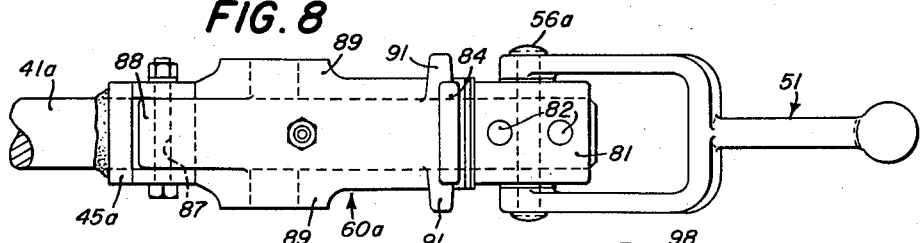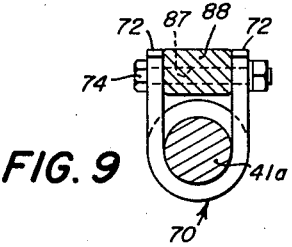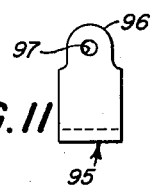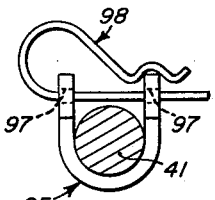

United States Patent Office 2,920,500
Patented Jan. 12, 1960

2,920,500

ADJUSTABLE LOCKING LIFT LINK

John H. Edman, Waterloo, Iowa, assignor, by mesne assignments, to Deere & Company, a corporation of Delaware Application July 21, 1955, Serial No. 523,418

12 Claims. (Cl. 74—491)

The present invention relates generally to agricultural implements and more particularly to hitch devices for connecting an agricultural implement with a farm tractor to be propelled and/or supported thereby.

The object and general nature of the present invention is the provision of an adjustable locking lift link adapted to be incorporated in a hitch device that connects an agricultural implement with a tractor, the general function of the adjustable locking link being to provide, first, for raising and lowering the implement by power derived from the power lift unit of the tractor, and second, a limited amount of lost motion between the implement and the tractor for the purpose of facilitating connecting the implement to the tractor, and/or other uses.

Other objects and advantages of the present invention will be apparent to those skilled in the art after a consideration of the following detailed description, taken in conjunction with the accompanying drawings, in which:

Fig. 1 is a generally diagrammatic side view of the forward portion of an agricultural implement, the rear portion of a farm tractor, and an interconnecting hitch device in which the principles of the present invention have been incorporated.

Fig. 2 is a fragmentary enlarged view showing the principal features of the adjustable link of the present invention, the parts being shown in which lost motion is locked out.

Fig. 3 is a sectional view taken along the line 3—3 of Fig. 2.

Fig. 4 is a fragmentary view, similar to Fig. 2, showing the position of the parts when the above mentioned lost motion is provided.

Fig. 5 is a fragmentary top view of the upper or right hand end of the link shown in Fig. 2.

Fig. 6 is an end view of the parts shown in Fig. 2, with the locking handle shown in a position extending radially, at which time the handle may be used to adjust the effective length of the link.

Fig. 7 is a view similar to Fig. 2, showing a modified form of the present invention.

Fig. 8 is a top view of the form of the invention shown in Fig. 7.

Fig. 9 is a sectional view taken generally along the line 9—9 of Fig. 7.

Fig. 10 is a view similar to Fig. 9, showing a modified form of locking collar, using a hairpin connector to hold the collar in position.

Fig. 11 is a side view of the locking collar shown in Fig. 10.

Referring first to Fig. 1, the present invention has been illustrated as incorporated in hitch means 20 acting to connect an agricultural implement 21 with a farm tractor 22. The implement 21 may be of any suitable character, and as shown represents a plow, the frame of which includes a generally vertical mast section 23 to which the upper and lower links 24 and 25 of the hitch 20 are connected. The tractor 22, to the rear end of which the forward ends of the upper and lower links 24 and 25 are pivotally connected, is also of generally conventional construction, embodying a main frame 27, in which the transmission and other parts are included, rear drive wheels 28, rear axle means 29, and a power lift unit 30 that includes a pair of lift arms 31, one at each side of the tractor. The rear or outer end of each of the lift arms 31 is provided with a bifurcated yoke member 32 swively connected, as at 33, with the main section of the arm 31, and each of the yoke members 32 is connected with the associated lower link 25, there also being one of the links 25 at each side of the tractor, by a lift link structure 35. There is or may be, one of the links 35 at each side of the tractor, but a detailed description of one will suffice.

Each of the link structures 35 comprises a lower sleeve member 36 having its lower end forked and pivotally connected, as at 37, to a lug 38 fixed to the rear portion of the associated draft link 25. The interior of the sleeve member 36 is screw threaded, as indicated at 38 in Fig. 2, and threadedly receives the screw threaded portion 39 of an upper rod or shaft member 41. Fixed to the upper end portion of the shaft 41 is a pair of axially spaced apart collars 44 and 45. The collar 44 comprises a generally cylindrical member fixed, as by a pin 46, to the upper end of the shaft 41. The lower collar 45 is secured, as by welding 48, to the shaft 41 with an appreciable space between the collars 44 and 45.

A locking handle 51 is pivotally connected to the collar 44, the handle 51 including a bifurcated section having side arms 52 and 53 with a projection receiving space 56 therebetween, as best shown in Fig. 6. Preferably, the locking handle 51 is mounted on a cross pivot 56 that cooperates with the pin 46 in fixing the collar 44 to the shaft 41.

A barrel member 60 is disposed between the collars 44 and 45 and, as best shown in Fig. 4, is so dimensioned in length that there is a space 61 between the lower end, or left end as viewed in Fig. 4, of the barrel member 60 and the adjacent collar 45. Opposite sides of the barrel member 60 are provided with boss sections 62 that are apertured, as at 63 (Fig. 5) to receive studs 54 that are carried in apertured sections 55 that form a part of the yoke member 32 (Fig. 1). The studs 54 define a pivotal axis about which the barrel member 60 may move relative to the lift arm 31, but rotation of the barrel member 60 upon its longitudinal axis is prevented. A projection 65 is formed near the upper end of the barrel member 60 and, as shown in Figs. 5 and 6, is almost as wide as the space 56 between the arms 52 and 53 of the locking handle 51. When the handle 51 is swung into a radially outwardly extending position, as shown in Fig. 6, the handle 51 may be used as means to rotate the shaft member 41 within the barrel 60 and the sleeve 35 and, by virtue of the screw threaded connection, 38, 39 between the members 35 and 41, such rotation serves to adjust the effective length of the link structure 35. In order to retain the adjustment, thus secured, the handle 51 may be swung down into a position alongside the barrel 60, with the side arms 52 and 53 disposed on opposite sides of the barrel member 65, thus locking the member 41 against rotation relative to the barrel member 60 and/or the associated lift link 31, particularly the yoke member 32 thereof.

The space 61, mentioned above, between the collar 45 and the barrel member 60 provides for a limited amount of generally vertical movement of the members 35 and 41 relative to the lift arm 31, and this lost motion or relative movement may be utilized in a number of ways. First, such lost motion facilitates the attachment of the associated draft link 25 with the implement, in connecting the latter with the tractor. Secondly, this lost motion also permits a limited amount of lateral tilting of the implement relative to the tractor, as may be necessary or desirable when the implement is relatively wide and must therefore tilt laterally to follow the ground surface over which the tractor and implement outfit is driven.

Under other conditions, it may be desirable to lock out or prevent such lost motion, and according to the principles of the present invention, this can be done easily and quickly by means of a locking collar 70, which may be in the form of a U-shaped member 71, Figs. 2 and 3, having ends 72 that project outwardly of the associated shaft 41 and are apertured, as at 73, to receive a connecting member in the form of a cross bolt 74 that extends through the openings 73 and through a spacer 75, as best shown in Fig. 3. The locking collar 70 is dimensioned so as to substantially fill the space 61, and thus prevent any axial movement of the shaft 41 within the collar member 60. Also, the barrel member 60 is provided with an extension 76 that, when the locking collar 70 is attached, is disposed between the ends 72 of the collar so as to prevent rotation of the latter and to hold the ends 72 in an upper position, which facilitates loosening and removing the bolts 74 when it is desired to take out the collar 70.

A modified form of the invention is shown in Figs. 7, 8 and 9. In this form, the locking handle 51 is connected by a pivot pin 56a to a collar 81 that is fixed, as by a pair of pins 82 to the upper end of the associated shaft member 41a. A collar 45a is fixed to the shaft 41a at a distance from the collar 81, and between the two collars a barrel member 60a is disposed, this barrel member being somewhat longer than the barrel member 60 described above. A projection 84 is formed on the upper end of the barrel member 60a and receives the locking handle 51 when it is swung downwardly into a position alongside the barrel 60a for locking the shaft 41a against rotation, in substantially the same way as described above.

The locking collar 70 may be disposed between the collar 45a and barrel member 60a for preventing any axial movement between the shaft member 41a and the barrel member 60a where such relative movement is not desired. As best shown in Fig. 9, the attaching bolt 74 may, in this form of the invention, be extended through an aperture 87 formed in an extension 88 carried at the lower end of the barrel member 60a, which extension lies between the ends 72 of the locking collar 70. By providing the extension 88 with an aperture, such as at 87, need for the spacer 75 is eliminated. The sleeve or barrel member 60a is provided with apertured bosses 89 to receive the studs 54 of the yoke member 32. Also, the sleeve member or barrel member 60a is provided with laterally extending bosses at 91 that cooperate with the handle member 51 in limiting the movement of the latter toward the barrel member 60a.

A modified form of locking collar is shown in Figs. 10 and 11. In this form, the collar member 95 is substantially identical with the collar 70 described above, except that the upper ends are rounded, as at 96, and apertured, as at 97, to receive a hairpin connection 98 that is adapted to be extended through the openings 97. This form of locking collar may substitute for the collar 70 shown in Fig. 2. It may also substitute for the collar 70 shown in Fig. 7, since the hairpin connection 98 may be turned in the position to clear the end of the barrel extension 88.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An adjustable link incorporated in the connections between an implement and a tractor, comprising an internally threaded sleeve member, a shaft member threaded at one end into one end of said sleeve member, a normally stationary barrel member in which the other end of said shaft member is received for rotary movement, means limiting axial movement of said shaft member relative to said barrel member, a handle member pivoted to but mounted nonrotatably on said other end of said shaft, and a boss on said barrel member adapted to receive said handle member in one position of the latter for locking said shaft member against rotation.

2. An adjustable link adapted to be connected between a tractor lift arm and a pivoted draft link, said adjustable link comprising a pair of screw threadedly interconnected members, a barrel member rotatably receiving one of the members of said pair, means serving as a pair of fixed stops on said one member and disposed on opposite sides of said barrel member and spaced therefrom so that the latter has limited axial movement relative to said one member, a part insertible between said barrel member and one of said fixed stops for locking out said axial movement, and means attachable to said part and barrel member to secure them together.

3. The invention set forth in claim 2, further characterized by said part comprising a member attachable to said one member, and an extension on said barrel member to engage said part when attached to said one member.

4. The invention set forth in claim 2, further characterized by said part comprising a U-shaped member adapted to be mounted on said one member between said barrel member and one of said fixed stops, with the ends of said U-shaped member extending outwardly at one side of said one member, and securing means connecting the ends of said U-shaped member and extending across the adjacent portion of said one member.

5. The invention set forth in claim 6, further characterized by an extension on said barrel member adapted to be disposed between said ends of the U-shaped member.

6. The invention set forth in claim 5, further characterized by said extension being apertured and said securing means extending through the aperture in said extension.

7. The invention set forth in claim 5, further characterized by said extension being disposed so as to clear the adjacent fixed stop when said locking part is removed.

8. An adjustable link adapted to be connected between a pair of parts to be adjusted, comprising a pair of screw threadedly interconnected members, a collar fixed to one end of one of said members, a second collar fixed to said one member and spaced thereon from said first collar, a barrel member journaled on said one member between said collars, a locking handle, means pivotally connecting the handle to one of said collars for swinging relative thereto between a generally radially outwardly extending position and a position disposed generally alongside said barrel member, said pivotal means providing the structure whereby the handle turns said one member relative to the other member, a projection on said barrel member, means forming an opening in said handle to receive said projection when said handle lies alongside said barrel, whereby relative rotation between said barrel member and said one member is restrained, said collars being spaced apart a distance greater than the corresponding dimension of said barrel member, whereby the latter has limited relative movement with respect to said one member, and a part insertable between said barrel member and the other of said collars for locking out said relative movement.

9. The invention set forth in claim 8, further characterized by said opening in the handle member being dimensioned longitudinally to accommodate axial movement of the barrel member projection when said barrel member moves relative to said one member with the handle lying alongside said barrel member.

10. An adjustable link adapted to be connected between a pair of parts to be adjusted, said adjustable link comprising a pair of screw threadedly interconnected members, a handle, means pivotally connecting the handle to one of said members, said pivotal means providing the structure whereby the handle turns said one member relative to the other member, the handle comprising a pair of side arms straddling the associated portion of said one member, a barrel member adapted to be swiveled to one of said parts for movement about a transverse axis relative thereto and thereby held against rotation about the longitudinal axis of said barrel member, said barrel member rotatably receiving said one member, means connecting the other of said parts to the other of said members, and means including a projection on said barrel member adapted to receive the side arms of said handle to hold said one member against rotation relative to said one part.

11. An adjustable link adapted to be connected between a pair of parts to be adjusted, comprising a pair of screw threadedly interconnected members, a collar fixed to one end of one of said members, a second collar fixed to said one member and spaced from said first collar, a barrel member journaled on said one member between said collars and carrying a projection, a locking handle, means pivotally connecting the handle to one of said collars for swinging relative thereto between a generally radially outwardly extending position, and a position disposed generally alongside said barrel member, said pivotal means providing the structure whereby the handle in its outwardly extending position turns said one member relative to the other member, and means on the handle to receive said projection.

12. An adjustable link adapted to be connected between a pair of parts to be adjusted, comprising a pair of screw threadedly interconnected members arranged in endwise relation and screw threadedly engaged at their adjacent end portions and one member being rotatable relative to the other, a collar fixed to the other end of said one member, a second collar fixed to said one member and spaced thereon from said first collar, a barrel member journaled on said one member between said collars and said barrel member being retainable by said collars against axial movement relative to said other end of said one member, means to connect the other of said members to one of said parts, means to connect said barrel member to the other of said parts, said two means serving to prevent rotation of the barrel member and said other member with respect to one another, a locking handle, means pivotally connecting the handle to one of said collars for swinging relative thereto for movement relative thereto about an axis that is transverse with respect to said one member between a generally radially outwardly extending position, and a position disposed generally alongside said barrel member, said pivotal means providing the structure whereby the handle in its outwardly extending position turns said one member relative to the other member, and interengaging means on said locking handle and said barrel member to lock the handle and said one member to said barrel member to prevent rotation of said one member relative to said barrel member and said other member.

References Cited in the file of this patent

UNITED STATES PATENTS

| | | |
|---|---|---|
| 146,182 | Howard | Jan. 6, 1874 |
| 1,003,131 | Bellingrath | Sept. 12, 1911 |
| 1,061,060 | Ford | May 6, 1913 |
| 1,432,490 | Peters | Oct. 17, 1922 |
| 1,444,864 | Biederman | Feb. 13, 1923 |
| 1,464,130 | Ferguson | Aug. 7, 1923 |
| 1,552,968 | Trotter | Sept. 8, 1925 |
| 2,309,750 | Carrington | Feb. 2, 1943 |
| 2,376,609 | McVicar | May 22, 1945 |
| 2,456,693 | Fraga | Dec. 21, 1948 |
| 2,540,429 | Cordes | Feb. 6, 1951 |
| 2,716,855 | Sorensen et al. | Sept. 6, 1955 |
| 2,723,569 | Ferguson et al. | Nov. 15, 1955 |
| 2,726,589 | Todd | Dec. 13, 1955 |

FOREIGN PATENTS

| | | |
|---|---|---|
| 669,976 | Germany | Jan. 9, 1939 |
| 74,311 | Norway | Nov. 22, 1948 |